United States Patent [19]

Pritchard

[11] Patent Number: 5,101,962

[45] Date of Patent: Apr. 7, 1992

[54] LOW PROFILE STEERABLE POWER DRIVE UNIT

[75] Inventor: Robert J. Pritchard, Lansdale, Pa.

[73] Assignee: Teleflex Incorporated, Limerick, Pa.

[21] Appl. No.: 770,131

[22] Filed: Oct. 1, 1991

Related U.S. Application Data

[63] Continuation-in-part of Ser. No. 542,981, Jun. 25, 1990, abandoned.

[51] Int. Cl.[5] ............................................. B65G 13/12
[52] U.S. Cl. .................................. 198/782; 198/369; 244/137.1; 414/533
[58] Field of Search .................. 198/369, 372, 782; 414/532, 533; 244/137.1

[56] References Cited

U.S. PATENT DOCUMENTS

| | | | |
|---|---|---|---|
| 3,910,402 | 10/1975 | Dean | 198/782 |
| 3,978,975 | 10/1976 | Herbest et al. | 198/782 |
| 4,050,655 | 9/1977 | Bogue et al. | 244/137.1 |
| 4,589,542 | 5/1986 | Steadman | 198/782 |
| 4,949,837 | 8/1990 | Huber | 198/782 |
| 4,989,809 | 2/1991 | Arnold | 244/137.1 |

Primary Examiner—Joseph E. Valenza
Attorney, Agent, or Firm—Reising, Ethington, Barnard, Perry & Milton

[57] ABSTRACT

A low profile steerable power drive unit assembly (10) comprises a cylindrical frame member (22) having an annular ledge (42) extending inwardly therefrom. The ledge (42) includes a flat upper race (46), a frustoconical lower race (48) and gear teeth (82) disposed along the ring-like interface between the upper (46) and lower (48) races. A support bracket (24) is rotatably supported in the frame member (22) about a vertical axis (A) by a plurality of outwardly extending wheels (34, 36) freely rollable along the upper race (46) and the lower race (48). A motor (52) is supported in the support bracket (24) and, through a gear train, operatively engages the gear teeth (82) on the ledge (42) to rotate the support bracket (24) within the frame member (22). The support bracket (24) receives two modular power drive units in side-by-side orientation. The frame member (22) includes a subjacent mounting surface (30) which is attached directly to a floor structure (12) for supporting the assembly (10) entirely above the floor structure (12).

14 Claims, 5 Drawing Sheets

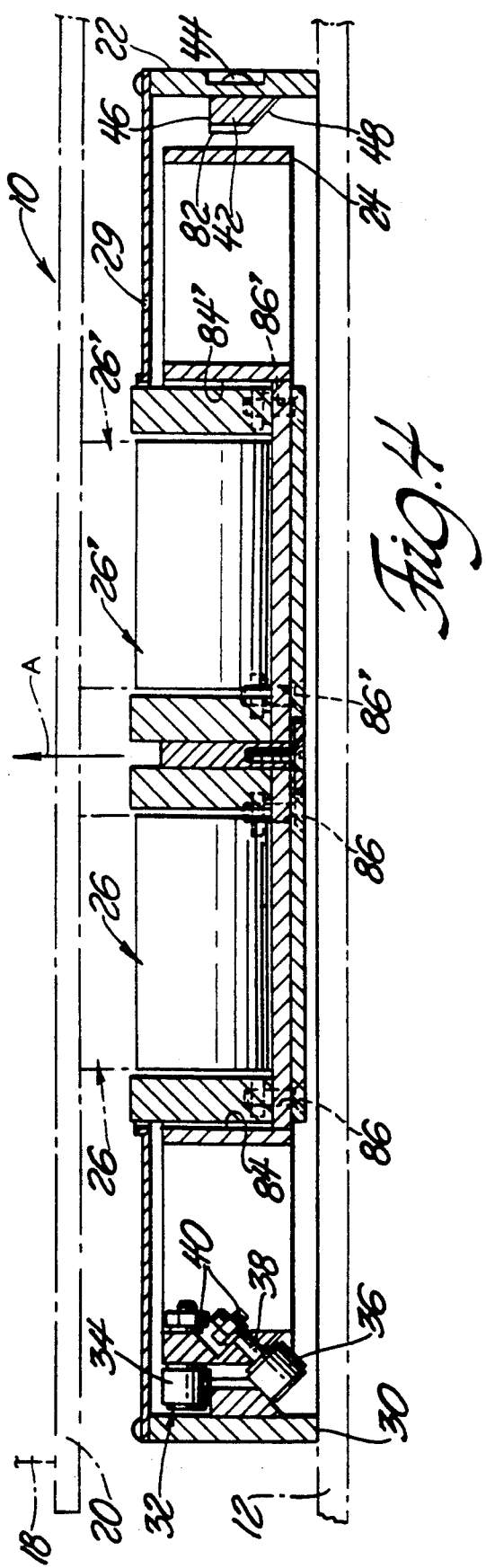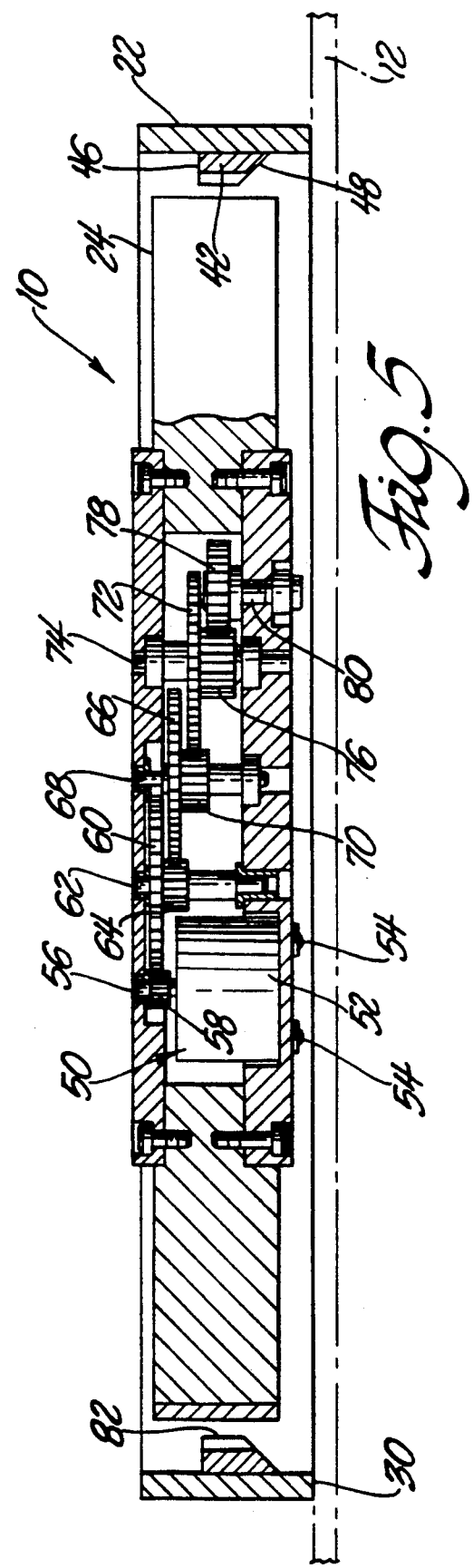

LOW PROFILE STEERABLE POWER DRIVE UNIT

This application is a continuation-in-part of application Ser. No. 542,981, filed June 25, 1990 now abandoned.

TECHNICAL FIELD

The subject invention generally relates to a power driven conveyor section having a live roll with means to adjust the position of the roll relative to the load. More specifically, the subject invention comprises a low profile steerable power drive unit operated in connection with a rollerway to accommodate freight on a freight carrier.

BACKGROUND ART

The accommodation of freight on freight carriers, such as aircraft, requires a reliable power driven conveyor system for moving the freight between stored and unstored conditions. Such power driven conveyors must be capable of moving the freight both laterally and longitudinally within the aircraft for several reasons. One such reason is that the freight may span only a portion of the width of the aircraft. For example, on the main deck of a wide body aircraft, such as the DC 10 or the 747, several freight containers may be placed side-by-side across the width in the aircraft cargo area. The power driven conveyor section is made steerable in order to shift the cargo laterally in the cargo area before transferring it longitudinally down the cargo area. Another reason for providing a steerable conveyor section is that most aircraft cargo areas are accessed through a door in the side of the fuselage. Freight must therefore be conveyed into the cargo area in a lateral direction, turned at a right angle and then conveyed longitudinally into the cargo area in a perpendicular longitudinal direction.

The shipping of cargo is a highly competitive industry. Profits are in large part dependent on the amount of cargo which can be moved in a given period of time. Accordingly, the more cargo which can be loaded on an aircraft, the greater the profit. And likewise, the faster the cargo can be loaded and unloaded, the greater the profit. As the size and weight of the conveyor system has a direct impact on the total weight of freight which can be loaded in an aircraft, as well as the speed with which the loading/unloading operation takes place, the shipping industry is highly receptive to technical improvements in the conveyor art.

Examples of prior art steerable cargo power drive units may be found in the U.S. Pat. Nos. 3,978,975 to Herbes et al, issued Sept. 7, 1976, and 4,589,542 to Steadman, issued May 20, 1986. These references disclose steerable power drive units mounted in association with rollerways in the aircraft cargo area and capable of driving the freight either longitudinally or laterally in the aircraft, as required. The prior art, however, it particularly deficient in that the steerable power drive units comprise large and heavy units which must be partially mounted below the floor surface. That is, a large hole is cut through the floor of the aircraft in order to allow a recessed mounting of the steerable drive unit. It will be appreciated that such a cutting of the floor of the aircraft structurally weakens the aircraft and permanently scars the floor. Furthermore, such units are large, bulky and subsequently very heavy. As weight plays a critical factor in the amount of cargo that can be loaded into an aircraft, the heavy prior art steerable power drive units are deficient.

SUMMARY OF THE INVENTION AND ADVANTAGES

The subject invention provides a steerable low profile power drive assembly of the type for conveying articles along a conveyor path. The assembly comprises a frame member, a support bracket rotatably connected to the frame member for rotation about a substantially vertical axis, roller means supported by the support bracket for independent rotation about a substantially horizontal axis for rollably engaging the underside of an article to be conveyed, and drive means operatively connected to the roller means for rotating the roller means about the horizontal axis. The invention is characterized by the frame member including a subjacent mounting surface disposed below the roller means for attachment to the floor structure for supporting the roller means entirely above the floor structure.

The subject invention overcomes the deficiencies in the prior art by providing a frame member having a subjacent mounting surface which allows the entire assembly to be mounted above the floor structure. In contradistinction to the prior art, the subject invention does not require the cutting of holes through the floor of the aircraft, and therefore does not weaken the aircraft as does the prior art. The subject invention provides a low profile which substantially decreases the weight of the unit in comparison to the prior art, and hence allows more freight to be loaded onto the aircraft thereby increasing the profitability of the carrier.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross-sectional view taken along lines 4—4 of FIG. 3;

FIG. 5 is a cross section of the subject invention taken along lines 5—5 of FIG. 3.

DETAILED DESCRIPTION OF THE PREFERRED EMBODIMENT

Figure 1:
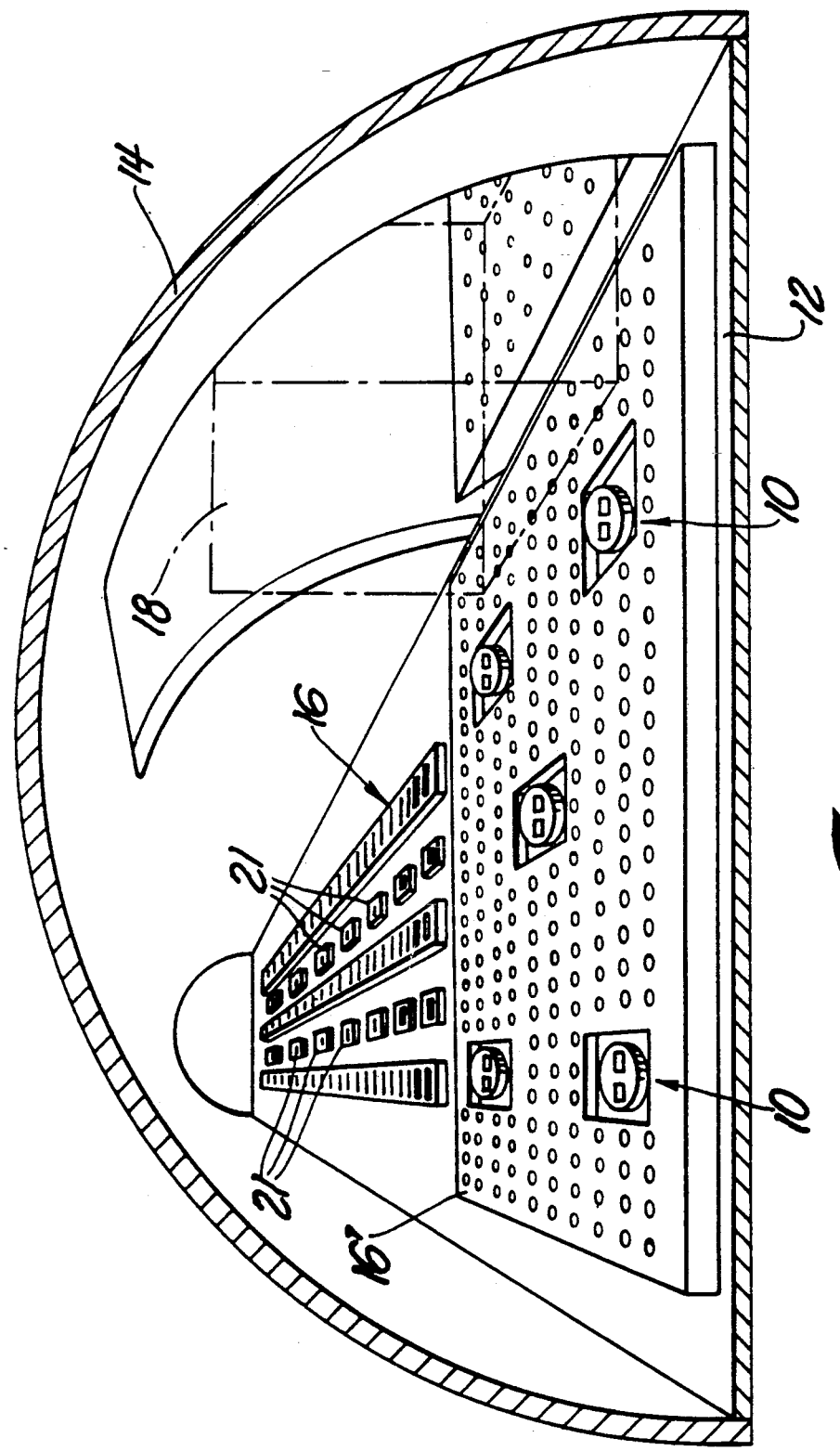
FIG. 1 is a perspective view of the interior cargo area of an aircraft including a conveyor system mounted on the floor thereof.
Figure 2:
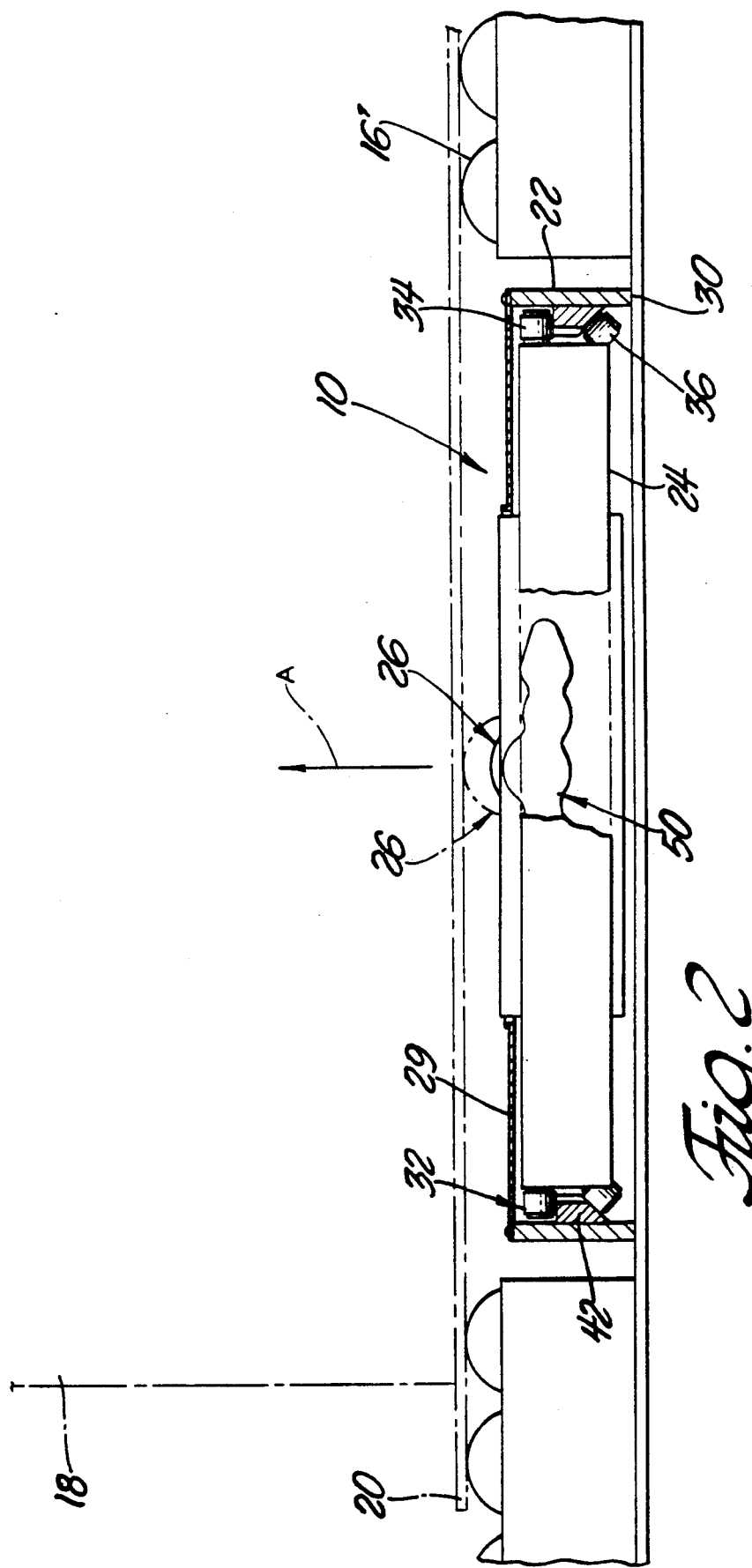
FIG. 2 is a cross-sectional view of the subject invention disposed between two omnidirectional rollerways for conveying an article.

Referring to the Figures, wherein like numerals indicate like or corresponding parts throughout the several views, a steerable low profile power drive assembly according to the subject invention is generally shown at 10. The power drive assembly 10 is mounted to the floor 12 of an aircraft 14. The power drive assembly 10 is operated in association with a rollerway conveyor system, generally indicated at 16. An article of freight or cargo 18 is shown in FIGS. 1, 2 and 4 supported on the rollerway 16. As in FIGS. 2 and 4, the cargo 18 may be supported on a flat skid 20. Therefore, the rollerway 16 and power drive assembly 10 form a conveyor path longitudinally within the cargo area of the aircraft 14 and along the floor 12 so as to allow the cargo 18 to be easily and automatically conveyed along the conveyor path.

As best shown in FIG. 1, a plurality of non-steerable power drive units 21 are disposed in strategic locations along the floor 12 of the aircraft 14 and in the midst of the rollerway 16 so that as the skid 20 and cargo 18 are conveyed along the rollerway 16, at least one power drive assembly 10, 21 is in engagement with the underside of the skid 20 at all times. A portion of the rollerway 16 comprises an omnidirectional area 16' lying directly inside the door area or nose area of the aircraft, and in some instances one additional station forwardly of the door area. The omnidirectional area 16' may comprise either a ball mat or omni-caster system as is well known. A plurality of the subject steerable power drive assemblies 10 are located in the midst of the omnidirectional area 16'.

The power drive assembly 10 includes a frame member 22. As shown in the Figures, the frame member 22 is annular and comprises a generally truncated cylinder. A support bracket 24 is rotatably connected to the frame member 22 for rotation about a substantially vertical axis A. The support bracket 24 is supported within the annulus of the frame member 22 and is rotatable relative to the frame member 22 about the vertical axis A.

Figure 3:
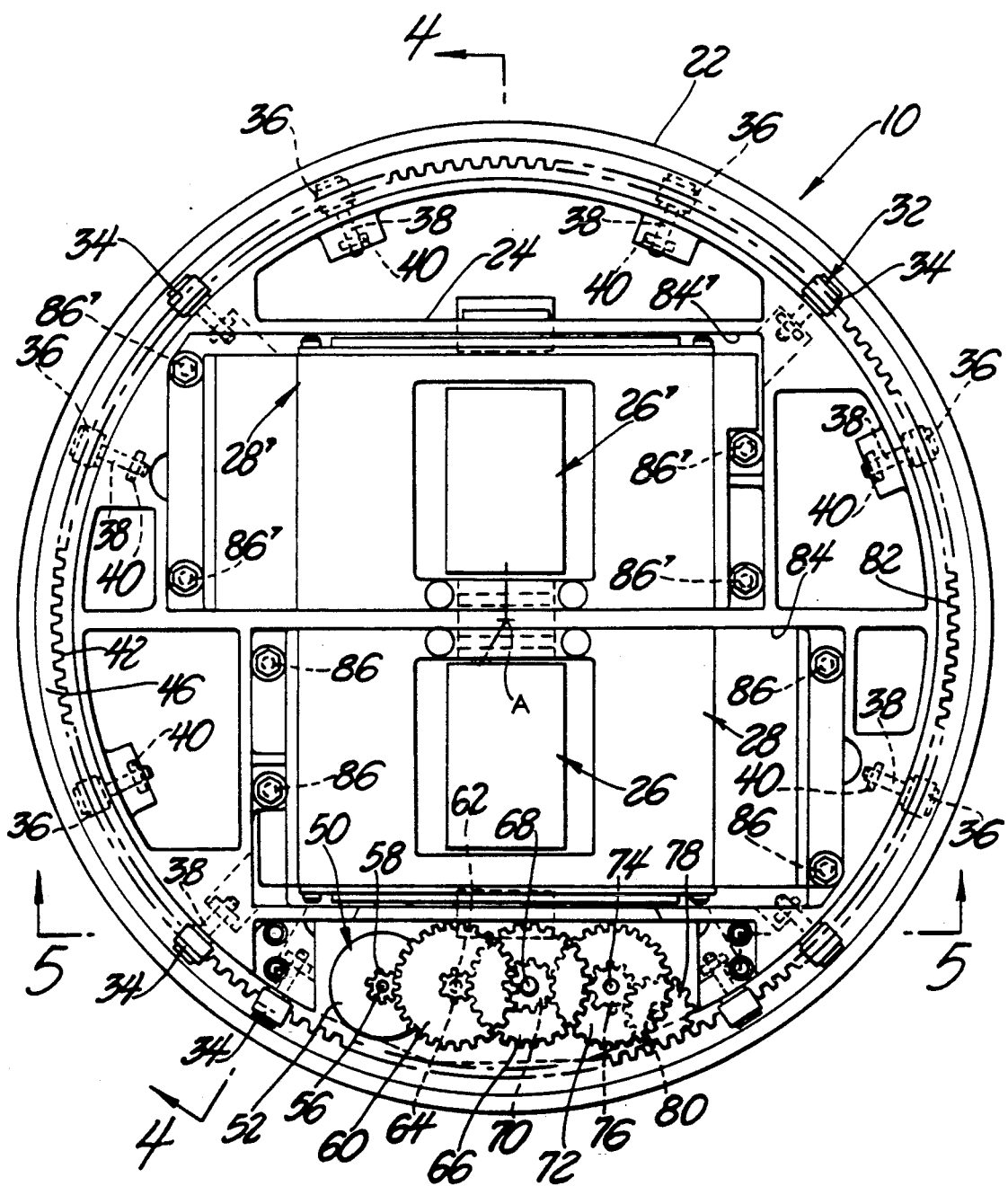
FIG. 3 is a top view of the subject invention.

A roller means, generally indicated at 26 in FIGS. 2, 3 and 4, is supported on the support bracket 24 for independent rotation about a substantially horizontal axis for rollably engaging the underside of the skid 20 to be conveyed along the rollerway 16. A drive means, generally indicated at 28, is operatively connected to the roller means 26 for rotating the roller means 26 about its horizontal axis. More particularly, the roller means 26 and drive means 28 are mounted as a removable modular unit such that, as a power drive unit, the roller means 26 and drive means 28 together may be installed and removed from the support bracket 24. That is, the roller means 26 and the drive means 28 comprise a detachable unit having the specific purpose of engaging the underside of the articles and forceably driving them along a conveyor path. Preferably, the modular roller means 26 and drive means 28 comprise one cylindrical roller powered by two separate electric motors. That is, two separate electric motors are operatively engaged with one single roller for providing twice the tractive force available when only one motor is used to power one roller. In FIGS. 2 and 4, a cover 29 is shown attached to the uppermost edge of the frame member 22 for protecting the assembly 10 while providing an opening for the roller means 26.

As shown in FIGS. 2, 4 and 5, the subject invention is characterized by the frame member 22 including a subjacent mounting surface 30 disposed below the roller means 26 for attachment to the floor structure 12 of the aircraft 14 for supporting the roller means 26 entirely above the floor 12. In other words, the subjacent mounting surface 30 supports the entire assembly 10 above the floor 12 of the aircraft 14 such that the entire frame member 22, the entire support bracket 24, the entire roller means 26 and the entire drive means 28 are disposed above the surface of the floor 12. The subjacent mounting surface 30 is situated directly below, or directly beneath, or underlies, the frame member 22. The subjacent mounting surface 30 allows the assembly 10 to be installed into the aircraft 14 without the necessity of cutting holes in the floor 12, and thereby does not impair the structural integrity of the floor 12.

As the diameter of the frame member 22 is preferably between twelve and fourteen inches, and the structural cross-members in freighter aircraft are typically twenty inches apart, extensions may be provided radially outwardly of the frame member 22 to support the assembly 10 directly on the structural cross members of the aircraft. Alternatively, many aircrafts converted from passenger service include structural seat tracks along the floor 12 of the cargo area. The subjacent mounting surface 30 may be easily modified to mount and attach directly to these seat tracks without requiring that a hole be cut in the floor 12.

Referring now to FIGS. 3 and 4, a stabilizer means, generally indicated at 32, is provided for rotatably stabilizing the support bracket 24 to the frame member 22 to prevent movement of the support bracket 24 relative to the frame member 22 in directions axially and laterally of the vertical axis A. That is, the stabilizer means 32 only allows the support bracket 24 to rotate relative to the frame member 22 about the vertical axis A, while restraining movement of the support bracket 24 relative to the frame member 22 in any other direction. The stabilizer means 32 is at least partially disposed above a plane parallel to the horizontal roller axis and tangent to the lowermost surface of the roller means 26, 26'. More specifically, the stabilizer means 32 includes a plurality of upper wheels 34 and lower wheels 36 supported for independent rotation about respective axes extending radially from the vertical axis A. As perhaps best shown in FIG. 3, each of the wheels 34, 36 extend radially outwardly from the support bracket 24. Hence, at least a portion of the wheels 34, 36 are disposed above the lowermost portion of the roller means 26, 26', as shown in FIG. 4. More specifically, the upper wheels 34 are disposed completely above the lowermost surface of the roller means 26, 26', whereas the lower wheels 36 are disposed parallel with the lowermost surface of the roller means 26, 26' when the roller means 26, 26' is in a retracted position. The wheels 34, 36 include a shank portion 38 disposed through an opening in the support bracket 24 and secured to the support bracket 24 from behind by a threaded fastener 40.

The stabilizer means 32 further includes a ledge 42 extending radially inwardly from the frame member 22 and spaced vertically above the subjacent mounting surface 30 for engaging the wheels 34, 36. As illustrated in FIG. 4, the ledge 42 is mounted to the frame member 22 midway between the subjacent mounting surface 30 and the upper surface of the frame member 22. A fastener, such as rivet 44, may be employed to secure the ledge 42 to the frame member 22. The ledge 42 has an upper race 46 which is disposed in a plane perpendicular to the vertical axis for engaging the upper wheels 34. The upper race 46 is a substantially flat annulus which provides a smooth rolling surface for the upper wheels 34. The ledge 42 further includes a frustoconical lower race 48 which is concentrically disposed with respect to the vertical axis A for engaging the lower wheels 36. Therefore, as best shown in FIG. 4, the upper 34 and lower 36 wheels are effectively clamped on opposite sides of the ledge 42. The upper wheels 34 and upper race 46 prevent downward axial movement of the support bracket 24, whereas the lower wheels 36 and lower race 48 prevent upward axial movement of the support bracket 24 and lateral movement of the support bracket 24.

A motor means, generally indicated at 50 in FIGS. 3 and 5, is provided for rotating the support bracket 24 relative to the frame member 22 about the vertical axis A. The motor means 50 includes an electric motor 52 supported on the support bracket 24 adjacent its outer edge. In other words, the electric motor 52 is fixed to the support bracket 24, as illustrated by the fasteners 54 shown in FIG. 5. The electric motor 52 includes an output shaft 56 supported in a bushing in the upper edge portion of the support bracket 24. A drive pinion 58 is fixed on the output shaft 56 and operatively engaged with a first gear 60. The first gear 60 is mounted on a shaft 62, which in turn is supported on opposite ends in bushings in the support bracket 24. A first pinion is fixed to the first shaft 62, and therefore rotates with the first gear 60. The first pinion 64 operatively engages a second gear 66 supported for rotation between opposite ends on a second shaft 68. A second pinion 70 is supported on the second shaft 68 and rotates with the second gear 66. The second pinion 70 operatively engages a third gear 72 supported for rotation on a third shaft 74. A third pinion 76 is fixed on the third shaft 74 for rotation with the third gear 72. The third pinion 76 operatively engages an output gear 78 supported for rotation on the shaft 80. Therefore, the electric motor 52, first shaft 62, second shaft 68, third shaft 74 and output gear shaft 80 are supported for rotation about parallel vertical axes on the support bracket 24. The drive pinion 58 is operatively connected to the output gear 78 through a reduction gear train which effectively reduces the output RPM of the electric motor 52 while increasing the output torque by a proportional degree.

As shown best in FIG. 3, a ring gear 82 is formed on the radially inward surface of the ledge 42 between the upper race 46 and the lower race 48. The ring gear 82 includes a plurality of parallel, vertically extending gear teeth operatively engaged with the output gear 78. Therefore, operation of the electric motor 52 causes the output gear 78 to rotate while engaged with the ring gear 82, thereby rotating the support bracket 24 relative to the frame member 22 about the vertical axis A. Typically, the subject power drive assembly 10 is controlled from a remote control station, where a signal is sent to the electric motor 52. The signal sent to the electric motor 52 commands the electric motor 52 to rotate in a certain direction and for a certain period of time thereby rotating the support bracket 24 relative to the frame member 22 by a given angle.

Figure 6:
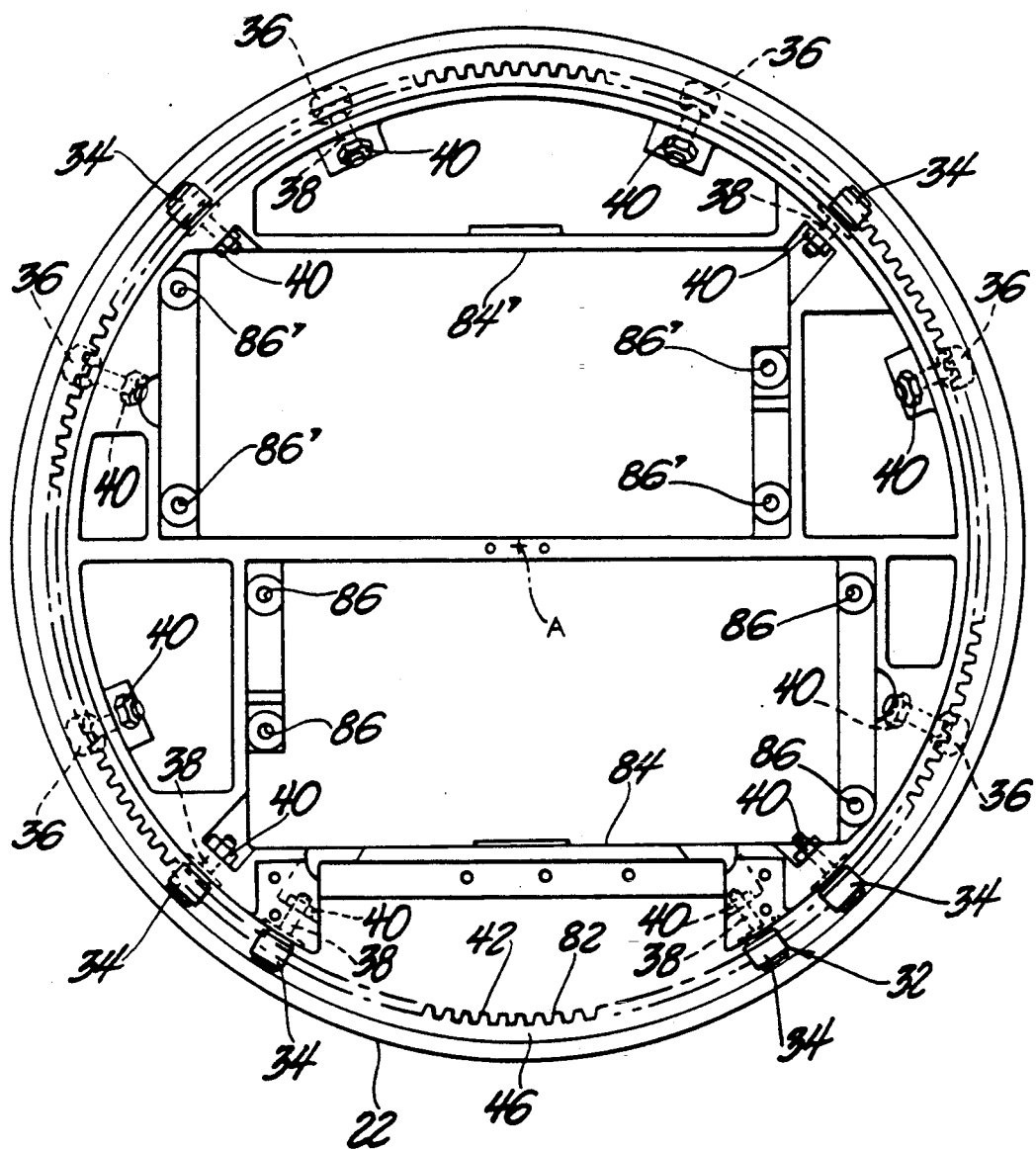
FIG. 6 is a top view of the frame member and support bracket of the subject invention.

Referring to FIGS. 3 and 6, the support bracket 24 is shown including a first receptacle 84 for receiving a modular first roller means 26 and first drive means 28. The first receptacle 84 includes four peripheral bores 86 for receiving fasteners with which to secure the first modular roller means 26 and drive means 28 to the support frame 24. Similarly, the support bracket 24 includes a second receptacle 84' for receiving a modular second roller means 26' and second drive means 28'. Likewise, four bores 86' are disposed about the periphery of the second receptacle 84' for securing the second modular unit to the support bracket 24.

As perhaps best shown in FIG. 6, the support bracket 24 comprises a skeletal structure whose only function is to support the roller means 26, 26', drive means 28, 28' and upper 34 and lower 36 wheels, along with the motor means 50. The first 84 and second 84' receptacles are disposed in the support bracket 24 to receive the first 26 and second 26' roller means for independent rotation about substantially parallel horizontal axes. The first receptacle 84 is disposed to receive the modular first roller means 26 and first drive means 28 in an orientation opposite that of the modular second roller means 26' and second drive means 28'. That is, the modular first roller means 26 and first drive means 28 are disposed 180° rotated from the modular second roller means and second drive means 28 to better nest the assemblies within the limited space.

In known fashion, and as suggested in phantom in FIG. 2, the first 26 and second 26' roller means are of the type which move upwardly from a retracted position to engage the under surface of the article 18 or skid 20 to be conveyed. In this manner, in the event of a power failure, the cargo 18 may be easily moved along the rollerway 16 without overcoming the dynamic braking action of the drive means 28, 28'.

The subject invention is particularly advantageous in that the steerable power drive assembly 10 may be floor mounted, whereas the prior art required a recessed mounting underneath the floor of the aircraft. By floor mounting the subject assembly 10, the aircraft 14 is not permanently scarred or weakened. Also, the structure is much more compact that has heretofore been known, and lighter in weight so that the aircraft may carry larger quantities of freight. Further, the subject invention 10 is much more easily installed in the aircraft as it may be easily bolted to the existing floor 12, whereas the prior art requires a time consuming mounting procedure including the cutting of holes in the aircraft floor.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A steerable low profile power drive assembly (10) of the type for conveying articles (18) along a conveyor path, said assembly (10) comprising: a frame member (22); a support bracket (24) rotatably connected to said frame member (22) for rotation about a substantially vertical axis (A); roller means (26, 26') supported by said support bracket (24) for independent rotation about a substantially horizontal axis for rotatably engaging the underside of an article (18) to be conveyed; drive means (28, 28') operatively connected to said roller means (26, 26') for rotating said roller means (26, 26') about said horizontal axis; and characterized by said frame member (22) including a subjacent mounting surface (30) disposed below said roller means (26, 26') for attachment to a floor structure (12) for supporting said roller means (26, 26') entirely above the floor structure (12), and stabilizer means (32) at last partially disposed above a plane parallel to said horizontal axis and tangent to the lowermost surface of said roller means (26, 26') for rotatably stabilizing said support bracket (24) relative to said frame member (22) to prevent movement of said support bracket (24) relative to said frame member (22) in directions axially and laterally of said vertical axis (A).

2. An assembly (10) as set forth in claim 1 further characterized by said stabilizer means (32) including a plurality of wheels (34, 36) each supported for independent rotation about respective axes extending radially from said vertical axis (A).

3. An assembly (10) as set forth in claim 2 further characterized by said stabilizer means (32) including a ledge (42) extending radially inwardly from said frame member (22) and spaced vertically above said subjacent mounting surface (30) for engaging said wheels (34, 36).

4. An assembly (10) as set forth in claim 3 wherein said wheels (34, 36) comprise a plurality of upper wheels (34) and a plurality of lower wheels (36), further characterized by said ledge (42) having an upper race (46) disposed in a plane generally perpendicular to said vertical axis (A) for engaging said upper wheels (34) and a frustoconical lower race (48) concentrically disposed with respect to vertical axis (A) for engaging said lower wheels (36).

5. An assembly (10) as set forth in claim 4 further characterized by including motor means (50) for rotating said support bracket (24) relative to said frame member (22) about said vertical axis (A).

6. An assembly (10) as set forth in claim 5 further characterized by said motor means (50) including an output gear (78) supported on one of said frame member (22) and said support bracket (24) and a ring gear (82) in operative engagement with said output gear (78) and supported on the other of said frame member (22) and said support bracket (24).

7. An assembly (10) as set forth in claim 6 further characterized by said output gear (78) being supported on said support bracket (24) and said ring gear (82) being supported on said frame member (22).

8. An assembly (10) as set forth in claim 7 further characterized by said ring gear (82) being formed on a radially inward surface of said ledge (42) between said upper race (46) and said lower race (48).

9. An assembly (10) as set forth in claim 8 further characterized by said motor means (50) including an electric motor (52) supported on said support bracket (24) and a reduction gear train operatively interconnecting said electric motor (52) and said output gear (78).

10. An assembly (10) as set forth in claim 9 wherein said roller means (26, 26') and said drive means (28, 28') are formed as a removable modular unit, further characterized by said support bracket (24) including a first receptacle (84) for receiving a modular first roller means (26) and first drive means (28).

11. An assembly (10) as set forth in claim 10 further characterized by said support bracket (24) including a second receptacle (84') for receiving a modular second roller means (26') and second drive means (28').

12. An assembly (10) as set forth in claim 11 further characterized by said first (84) and second (84') receptacles disposed to receive said first (26) and second (26') roller means for independent rotation about substantially parallel horizontal axes.

13. An assembly (10) as set forth in claim 12 further characterized by said first receptacle (84) being disposed to receive said modular first roller means (26) and said first drive means (28) in an orientation opposite that of said modular second roller means (26') and second drive means (28') in said second receptacle (84').

14. A steerable low profile power drive assembly (10) of the type for conveying articles (18) along a conveyor path, said assembly (10) comprising: a generally cylindrical frame member (22) having an inwardly extending cantilever ledge (42), said ledge having a planar annular upper race (46) and a frustoconical lower race (48); a support bracket (24) disposed within said frame member (22) and having a plurality of radially extending upper wheels (34) in rolling engagement with said upper race (46) and a plurality of radially extending lower wheels (36) in rolling engagement with said lower race (48); a removable modular power drive unit for rollably engaging and driving the underside of an article (18) to be conveyed; a motor (52) supported in said support bracket (24); a ring gear (82) fixed to said frame member (22) and operatively engaged with said motor (52); and characterized by said frame member (22) including a subjacent mounting surface (30) disposed below said support bracket (24) and said power drive unit for attachment to a floor structure (12) for supporting said support bracket (24) and said power drive unit entirely above the floor structure (12).

* * * * *